(No Model.)
J. THOMSON.
MECHANICAL MOVEMENT.
No. 331,847. Patented Dec. 8, 1885.
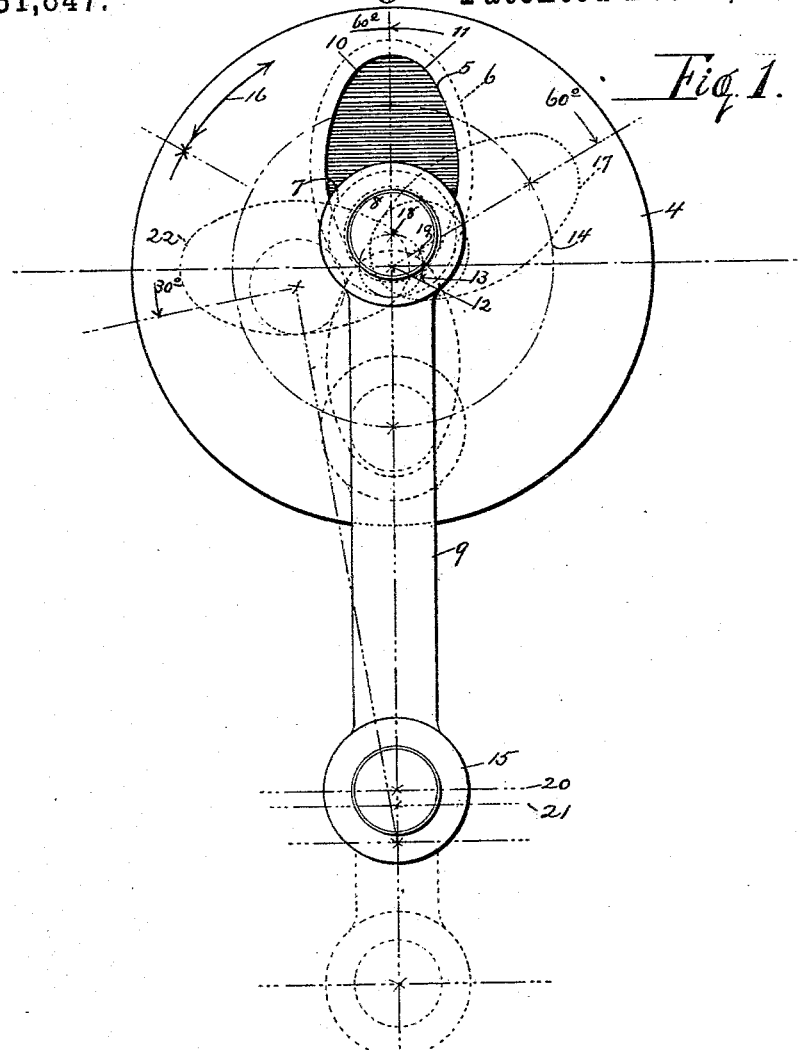
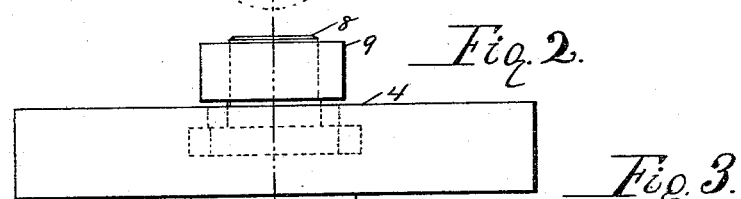
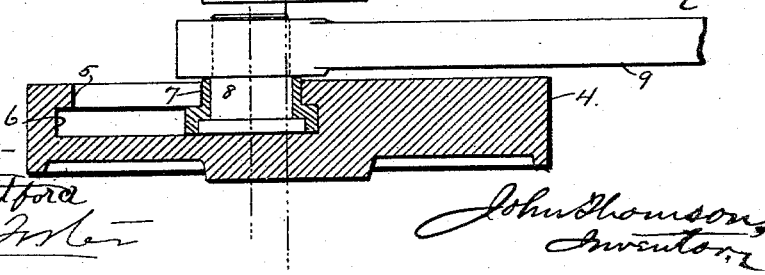
Witnesses:
James Whitford
Charles E. Foster
John Thomson
Inventor

UNITED STATES PATENT OFFICE.

JOHN THOMSON, OF BROOKLYN, NEW YORK.

MECHANICAL MOVEMENT.

SPECIFICATION forming part of Letters Patent No. 331,847, dated December 8, 1885.

Application filed November 4, 1885. Serial No. 181,857. (No model.)

*To all whom it may concern:*

Be it known that I, JOHN THOMSON, of Brooklyn, Kings county, and State of New York, have invented certain new and useful Improvements in Mechanical Movements, of which the following is a specification.

My invention relates to mechanical movements; and it consists in a device for producing, from continuous rotary motion, a variable or differential reciprocating movement by an action simulating that of an ordinary crank. The object and result of the said movement is to combine relatively and separately great amplitude of motion with great slowness of motion, or, conversely, to obtain great velocity and great power.

I term the invention a "differential crank."

Figure 1 of the drawings is a diagram elevation of my device; Fig. 2, an edge view, and Fig. 3 a transverse section on line C of Fig. 1.

The disk 4 is assumed to represent a gearwheel or a pulley driven by pinion, screw, or belt, or as a face-plate, or the projecting end of a shaft in which is formed a cam-opening preferably having two sections—an upper or outer, 5, and an inner or recessed portion, 6, as shown. In the cam-opening is a friction-roller, 7, of two diameters, the greater diameter fitting the recessed portion and the lesser diameter the upper section. The roller is journaled on a stud or crank-pin, 8, fixedly secured to the connecting rod or bar 9. The fixed stud, however, may conform to the form of the roller, and the latter may be dispensed with. The form or contour of each end of the cam-opening, as from the points 10 to 11, is the arc of a circle of like radius to that of the roller, for which roller the said ends of the cam form bearings alternately. The form or contour of each of the sides of the cam, and of each of the sections thereof connecting the said end bearings, is the arc of any desired curve, provided that the breadth of the cam over its upper section be sufficient to permit the greater diameter of the roller to pass.

The full lines of the figure show the action on "dead-center." The center of motion of the disk is at 12, the center of the inner end of the cam describes the circle 13, while the center of the outer end of the cam describes the circle 14; but both of the centers of the said end bearings are on the same radius-line of the disk. The extension of the connecting rod or bar at 15 may be assumed to be connected to any mechanism to which the motion of the crank is desired to be imparted—as, say, the bed or platen of a stamping or drawing press, cutting, shearing, punching, or die machinery, &c. The device, as illustrated in this application, is especially applicable when the said connection of the bar at 15 is beneath or at an angle lower than that of the center of the disk, as will appear hereinafter. The motion of the disk may be in either or both directions, as indicated by arrow 16.

Referring first to dotted outline 17, it will be seen that the center of the stud has been carried from 18 to 19 and the connecting-rod dropped from 20 to 21 at the speed of the circle 13, or corresponding, in the proportions here shown, to sixty degrees of motion in the disk. Continued action of the disk will now result, as shown in dotted outline 22—that is, as the inner curved side of the cam coincides with and passes the horizontal line, the stud is carried outward into the cam by the roller, and will continue to roll outward, increasing its radius until reaching the outer end of the cam, and thereby the maximum speed of the greater circle 14. The roller and stud will then pass as a fixed crank until the horizontal line or line of coincidence will have been reached and passed on the return motion, when the action just described will be reversed, the stud being carried inward until it reaches the inner end of the cam, when it is again carried as a fixed crank, but at the speed of the lesser circle. The roller only acts as such when passing along the sides of the cam from one fixed bearing to the other. During its travel at either the inner or outer bearing ends of the cam it becomes locked, and serves as a bushing or bearing for the stud. Thus no portions of the cam are subjected to abrasive action. The sides of the cam may be formed parallel or as a slot or a rib, on which slides a block connected to the rod 9; but in such instance the change of motion is too abrupt, and I therefore prefer a cam having curved sides, as in this wise the change of motion is effected very smoothly, without shock or jar. The degree, kind, or extent of curvature will depend upon the character of duty to be performed. Theoretically, however, a curve of the ellipse order would appear to cover the greater number of conditions in practice. Opposite sides of the cam may also be formed to curves of different kinds or degree, in that, where the motion of the disk is continuously in one direction, the speed of the change of crank-radius may be less or greater on the in or out motion of the roller and stud. Neither need the cam be of double section, as shown and described, although the described form is much the preferable, in that the connecting-rod is thereby practically locked to the disk. The cam may also be cut entirely through the disk.

It will be seen that neither the "throw" nor the action as a power-transmitting member is limited or compromised each to the other in this device, as, to illustrate, the throw might be ten inches or ten feet, while the action as a power member in either instance may be the same, or practically unlimited, as the lesser radius may bear any desired relation to the center of motion, whether the cam and its fixed bearings be formed in a disk, as shown, or in a segment or an arm.

Broadly, I conceive the controlling advantages of this device to be, first, practically unlimited amplitude of motion; second, practically unlimited as a power-transmitting member; third, the two aforenamed features in combination; and, fourth, that during its action as a power member the strain is exerted more nearly in a straight line, and consequently with much less cramping tendency, than in the ordinary crank or toggle, in which the desired throw establishes the common radius irrespective of the required duty as a power-transmitting agent.

I claim—

1. A crank having two fixed bearings of different radii, the said bearings being extended to form a cam in which is caused to operate a roller and a stud, the said stud being connected to the mechanism to which the motion of the crank is desired to be imparted.

2. A crank having two fixed bearings of different radii, the said bearings being extended to form a cam with which is caused to operate a bearing, the said bearing being connected to the mechanism to which the motion of the crank is desired to be imparted.

3. A crank having two fixed bearings of different radii, the said bearings being extended to a cam formed to the arc of a curve, a roller and stud operating in one bearing, and then changing to and operating in the other bearing, and mechanism connected to the stud.

4. A crank having two fixed bearings of different radii, the said bearings being extended to form a cam of two sections, an upper and a lower or recessed portion, in which is a roller of two diameters adapted to the two said sections of the cam, a stud acting in the roller, and mechanism connected to the stud, substantially as described.

5. A mechanical movement consisting of a rotating disk having a radial cam, a bearing traversing said cam, and a connection between said bearing and the object to be moved, substantially as described.

6. In a mechanical movement, the combination of a rotating disk having a radial cam or slot extending from a point opposite the end of the disk-shaft radially toward the periphery, a stud adapted to take a positive bearing at each end of the cam, and a connection between the stud and the object to be moved, substantially as described.

In testimony whereof I have signed my name to this specification in the presence of two subscribing witnesses.

JOHN THOMSON.

Witnesses:
　JAS. G. COOPER,
　JAMES WHITFORD.